Dec. 18, 1962 S. M. DOMANSKI 3,069,276
CERAMIC DIELECTRIC MATERIALS AND CAPACITORS
INCORPORATING SUCH MATERIALS
Filed June 19, 1961
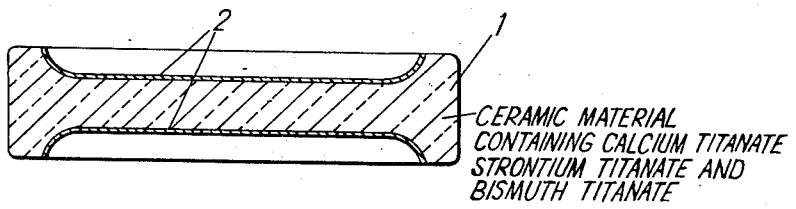
CERAMIC MATERIAL
CONTAINING CALCIUM TITANATE
STRONTIUM TITANATE AND
BISMUTH TITANATE
Inventor
S. M. Domanski
By
Webb Mackey & Burden
Attorney

3,069,276
CERAMIC DIELECTRIC MATERIALS AND CAPACITORS INCORPORATING SUCH MATERIALS

Stanislaus Marian Domanski, London, England, assignor to British Dielectric Research Limited, London, England, a British company
Filed June 19, 1961, Ser. No. 118,017
9 Claims. (Cl. 106—39)

This invention relates to ceramic dielectric materials made from alkaline earth metal titanates and to electric capacitors incorporating such materials as dielectric.

The object of the invention is to provide materials of high permittivity, e.g. of the order of 200, and low power factor, e.g. with loss tangents below $5 \times 10^{-4}$ measured at 1 megacycle per second, such materials being especially suitable for use as the dielectric of capacitors designed to carry heavy currents at high frequencies.

The present invention is based on our discovery that materials satisfying these requirements can be made from mixtures of calcium and strontium titanates containing certain proportions of a bismuth titanate or titanates.

In accordance with the invention, a ceramic dielectric material comprises calcium, strontium and bismuth titanates in proportions such that (a) strontium titanate forms 10% to 65% by weight of the total weight of calcium and strontium titanates used (b) the total weight of bismuth oxide and titanium dioxide (other than that combined with the calcium and strontium to form calcium and strontium titanates) is from 3.5% to 17% of the total weight of calcium and strontium titanates and (c) the molar percentage of the titanium dioxide, referred to in (b), is 50% to 80% of the total content of said titanium dioxide and the bismuth oxide. The composition can be expressed as:

$$a\mathrm{CaTiO_3} + b\mathrm{SrTiO_3} + (c\mathrm{Bi_2O_3} + d\mathrm{TiO_2})$$

in which the ratios between $a$, $b$, $c$ and $d$ are as set out in Table I below:

Table I

|  | Wt. ratio | Molar ratio |
|---|---|---|
| $\dfrac{b}{a+b}$ | 0.1 to 0.65 | 0.074 to 0.58 |
| $\dfrac{c+d}{a+b}$ | 0.035 to 0.17 | 0.024 to 0.118 |
| $\dfrac{d}{c+d}$ | 0.15 to 0.40 | 0.50 to 0.80 |

By using ingredients within these proportions, we have obtained ceramic bodies having permittivities in the range of 180 to 260 and loss tangents within the range of 1 to $4 \times 10^{-4}$ measured at 1 megacycle per second. Moreover these bodies showed only a small variation in loss tangent with frequency in the radio frequency range.

The invention will be further described with reference to a number of examples of ceramic compositions and with reference to the accompanying drawing, which is a sectional elevation of a capacitor made in accordance with the invention.

We prefer to use bodies in which the composition ranges represented by the ratios between $a$, $b$, $c$, and $d$ are limited as set out in Table II below:

Table II

|  | Wt. ratio | Molar ratio |
|---|---|---|
| $\dfrac{b}{a+b}$ | 0.25 to 0.60 | 0.197 to 0.525 |
| $\dfrac{c+d}{a+b}$ | 0.047 to 0.105 | 0.036 to 0.064 |
| $\dfrac{d}{c+d}$ | 0.20 to 0.35 | 0.60 to 0.750 |

These latter bodies have permittivities in the range of 230 to 260 and loss tangents below $2 \times 10^{-4}$ at one megacycle per second.

Our preferred method of manufacturing dielectric materials in accordance with the invention is to mix together appropriate quantities of calcium titanate, strontium titanate, bismuth oxide and rutile by ball-milling in an aqueous slurry. A small quantity of a suitable binder, for example bentonite, may be added if required. The use of precalcined calcium and strontium titanates is especially preferable when the strontium titanate content is in the higher part of the range. For compositions with a low strontium titanate content the strontium and/or calcium can be added to the slurry in the form of a compound or compounds that decompose under the subsequent firing conditions to produce calcium and/or strontium oxides.

The slurry from the ball-mill is filtered, dried, shaped by standard methods and sintered by firing at temperatures between about 1280 and 1300° C. A suitable sintering time is from 2–3 hours but the firing schedule will depend to some extent on the size and shape of the article being manufactured.

We prefer to use a dielectric material of approximately the following composition

|  | Gms. |
|---|---|
| Calcium titanate | 50 |
| Strontium titanate | 50 |
| Bismuth titanate ($\mathrm{Bi_4Ti_3O_{12}}$) | 10 |

Ingredients in these proportions on firing give a body with a permittivity of about 250 and a loss tangent of approximately $1 \times 10^{-4}$ at 1 megacycle.

The composition by weight of the dielectric material referred to in the preceding paragraph and the compositions of further examples of ceramic dielectric materials in accordance with the invention are set out in Table III below, the above example forming Example 1. The permittivity is given in the column headed K and the loss tangent at a frequency of 1 megacycle per second is given in the column headed Tan δ.

Table III

| Example | CaTiO₃ | SrTiO₃ | Bi₂O₃ | TiO₂ | K | Tan δ |
|---|---|---|---|---|---|---|
| 1 | 45.5 | 45.5 | 7.24 | 1.86 | 240 | 1 |
| 2 | 45.5 | 45.5 | 7.2 | 1.8 | 230 | 1×10⁻⁴ |
| 3 | 47.6 | 47.6 | 3.8 | 1.0 | 240 | 2 |
| 4 | 45.0 | 45.0 | 8.0 | 2.0 | 255 | 1 |
| 5 | 68 | 22.8 | 7.3 | 1.9 | 165 | 2 |
| 6 | 36.5 | 54.5 | 7.1 | 1.9 | 255 | 2 |
| 7 | 54.5 | 36.5 | 7.1 | 1.9 | 230 | 1 |
| 8 | 81.8 | 9.1 | 7.24 | 1.86 | 170 | 3 |
| 9 | 31.9 | 59 | 7.24 | 1.86 | 275 | 3 |
| 10 | 45.5 | 45.5 | 7.65 | 1.35 | 230 | 4 |
| 11 | 45.5 | 45.5 | 5.4 | 3.6 | 250 | 4 |
| 12 | 48.3 | 48.3 | 2.7 | 0.7 | 235 | 3.5 |
| 13 | 42.7 | 42.7 | 11.6 | 3 | 258 | 4 |

In this table Examples 1–7 have composition ranges within the preferred limits set out in Table III above and Examples 8–13 have composition ranges outside the limits set out in Table II but within the limits set out in Table I.

Example 8 is a composition containing the maximum content of calcium titanate, relative to the strontium titanate content, within the scope of the invention and Example 9 a composition containing the minimum calcium titanate content; in these two examples, the content of bismuth titanate is the preferred content (as in Example 1) and the ratio between bismuth oxide and titanium dioxide is the preferred ratio (also as in Example 1).

Examples 10 and 11 are compositions containing the maximum and minimum proportions respectively of titanium dioxide in the bismuth titanate.

Examples 12 and 13 are compositions containing the minimum and maximum bismuth titanate contents respectively, in compositions containing equal proportions of calcium and strontium titanates.

Capacitors having dielectric materials in accordance with the invention can be made by standard methods such as by forming electrodes directly on the surface of the dielectric material by a suitable metallisation process. They have the advantage of unsuually low heat generation when carrying heavy currents at high frequencies. For example, a suitable form of capacitor is a flanged disc type of capacitor consisting of a disc of the ceramic material having a suitably shaped thickened rim, the disc being provided with adherent electrodes by painting the appropriate surfaces with a silver paint and firing the paint to produce an adherent layer of silver. Such a capacitor is shown in the accompanying drawing, in which a ceramic dielectric body 1 made in accordance with Example 1 above is provided with silver electrodes 2.

What I claim as my invention is:

1. A ceramic dielectric material having a loss tangent below $5 \times 10^{-4}$ at one megacycle per second consisting essentially of calcium, strontium and bismuth titanates in proportions such that (a) strontium titanate forms 10% to 65% by weight of the total weight of calcium and strontium titanates used (b) the total weight of bismuth oxide and titanium dioxide (other than that combined with the calcium and strontium to form calcium and strontium titanates) is from 3.5% to 17% of the total weight of calcium and strontium titanates and (c) the molar percentage of the titanium dioxide, referred to in (b), is 50% to 80% of the total content of said titanium dioxide and the bismuth oxide.

2. A ceramic dielectric material having a loss tangent below $5 \times 10^{-4}$ at one megacycle per second consisting essentially of calcium, strontium and bismuth titanates in proportions such that (a) strontium titanate forms 20% to 60% by weight of the total weight of calcium and strontium titanates used (b) the total weight of bismuth oxide and titanium dioxide (other than that combined with the calcium and strontium to form calcium and strontium titanates) is from 4.7% to 10% of the total weight of calcium and strontium titanates and (c) the molar percentage of the titanium dioxide, referred to in (b), is 60% to 75% of the total content of said titanium dioxide and the bismuth oxide.

3. A ceramic dielectric material having a loss tangent below $5 \times 10^{-4}$ at one megacycle per second having a composition substantially as follows:

| | Gms. |
|---|---|
| Calcium titanate | 50 |
| Strontium titanate | 50 |
| Bismuth titanate ($Bi_4Ti_3O_{12}$) | 10 |

4. A method of manufacturing a ceramic material having a loss tangent below $5 \times 10^{-4}$ at one megacycle per second which comprises mixing together calcium titanate, strontium titanate, bismuth oxide and rutile and firing the mixture, the quantities of the ingredients used being such as to produce a ceramic material in which (a) strontium titanate forms 10% to 65% by weight of the total weight of calcium and strontium titanates used (b) the total weight of bismuth oxide and titanium dioxide (other than that combined with the calcium and strontium to form calcium and strontium titanates) is from 3.5% to 17% of the total weight of calcium and strontium titanates and (c) the molar percentage of the titanium dioxide, referred to in (b), is 50% to 80% of the total content of said titanium dioxide and the bismuth oxide.

5. A method as claimed in claim 4 in which the starting materials include a small quantity of a binder.

6. A method as claimed in claim 5 in which the binder is bentonite.

7. A method of manufacturing a ceramic material having a loss tangent below $5 \times 10^{-4}$ at one megacycle per second which comprises mixing together calcium titanate, strontium titanate, bismuth oxide and rutile and firing the mixture, the quantities of the ingredients used being such as to produce a ceramic material in which (a) strontium titanate forms 20% to 60% by weight of the total weight of calcium and strontium titanates used (b) the total weight of bismuth oxide and titanium dioxide (other than that combined with the calcium and strontium to form calcium and strontium titanates) is from 4.7% to 10% of the total weight of calcium and strontium titanates and (c) the molar percentage of the titanium dioxide, referred to in (b), is 60% to 75% of the total content of said titanium dioxide and the bismuth oxide.

8. A method as claimed in claim 7 in which the starting materials include a small quantity of a binder.

9. A method as claimed in claim 8 in which the binder is bentonite.

References Cited in the file of this patent

FOREIGN PATENTS

| 445,269 | Great Britan | Apr. 6, 1936 |
| 450,945 | Canada | Aug. 31, 1948 |
| 574,577 | Great Britain | Jan. 11, 1946 |

OTHER REFERENCES

Baldwin: Ceramic Industry, August 1958, "How to Use Electronic Ceramics Better (pages 88–92).